United States Patent
Buttz et al.

(10) Patent No.: US 6,523,629 B1
(45) Date of Patent: *Feb. 25, 2003

(54) TANDEM MOBILE ROBOT SYSTEM

(75) Inventors: James H. Buttz, Albuquerque, NM (US); David L. Shirey, Albuquerque, NM (US); David R. Hayward, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/746,726

(22) Filed: Dec. 21, 2000

Related U.S. Application Data

(60) Provisional application No. 60/138,118, filed on Jun. 7, 1999.

(51) Int. Cl.[7] .......................... B62D 1/28; B62D 55/084
(52) U.S. Cl. .................. 180/167; 180/9.32; 180/9.4; 180/14.2; 280/474; 280/512; 901/1
(58) Field of Search .................. 180/9.1, 167, 204, 180/9.4, 9.32, 14.2, 14.5, 14.1, 900, 901; 280/474, 493, 491.5, 512, 514, 511, 506, 508; 701/23, 28, 24, 2; 700/245, 246, 261; 901/1

(56) References Cited

U.S. PATENT DOCUMENTS

| | | | | |
|---|---|---|---|---|
| 1,515,756 A | * | 11/1924 | Roy | |
| 2,879,079 A | * | 3/1959 | Edwards | |
| 3,215,219 A | * | 11/1965 | Forsyth et al. | 180/9.4 |
| 3,815,683 A | * | 6/1974 | Collin et al. | 180/9.4 |
| 4,645,023 A | * | 2/1987 | Rea et al. | 180/9.32 |
| 5,022,812 A | * | 6/1991 | Coughlan et al. | 180/9.32 |
| 5,373,909 A | * | 12/1994 | Dow et al. | 180/9.1 |
| 5,435,405 A | * | 7/1995 | Schempf et al. | 180/9.1 |
| 5,984,032 A | * | 11/1999 | Gremillion et al. | 180/9.1 |
| 6,000,766 A | | 12/1999 | Takeuchi et al. | |

FOREIGN PATENT DOCUMENTS

| | | | | |
|---|---|---|---|---|
| DE | 3618626 | * | 12/1987 | 180/14.2 |
| JP | 198172 | * | 12/1982 | 180/167 |
| JP | 95989 | * | 4/1990 | 180/901 |
| JP | 2-172684 | * | 7/1990 | |
| JP | 406183374 | * | 7/1994 | 180/9.1 |
| SU | 1713837 | * | 2/1992 | 180/9.32 |
| WO | 8702635 | * | 5/1987 | 180/9.1 |
| WO | 92022450 | * | 12/1992 | 180/167 |

OTHER PUBLICATIONS

Klarer and Purvis, "A Highly Agile Mobility Chassis Design for a Robotic All–Terrain Lunar Exploration Rover".

Pletta, "Surveillance and Reconnaissance Ground Equipment (SARGE), Real Robots for Real Soldiers," Sandia Report SAND94–0767C, for presentation at the Fifth International Symposium on Robotics and Manufacturing, Aug. 15–17, 1994, in Maui, HI.

Amai et al., "Robotic All–Terrain Lunar Exploration Rover (Ratler) FY93 Program Status Report," Sandia Report SAND94–1706, Oct. 1994.

Drive track shown on Honda Two–Stage Snowblowers' information sheets.

Designtech Engineering Co., GTC100 operator interface product sheet.

FreeWave Technologies, Inc., RS232 OEM Module Technical Specifications and Configuration Guide.

(List continued on next page.)

*Primary Examiner*—Anne Marie Boehler
(74) *Attorney, Agent, or Firm*—Suzanne L. K. Rountree; Fred A. Lewis

(57) ABSTRACT

A robotic vehicle system for terrain navigation mobility provides a way to climb stairs, cross crevices, and navigate across difficult terrain by coupling two or more mobile robots with a coupling device and controlling the robots cooperatively in tandem.

21 Claims, 14 Drawing Sheets

OTHER PUBLICATIONS

Tern Inc., A-Engine-P™ data sheet.

Southern California Microwave, VT05 series features and specifications and VR20 series features and specifications.

Microchip Technology Inc., "PIC16C7X," DS30390A—p. 2-517, 1995.

MicroOptical Corp., clip-on display monocle data sheet.

Shirey, et al., U.S. patent application 09/746,717, "Mobility Platform Coupling Device and Method for Coupling Mobility Platforms," filed Dec. 21, 2000 with the USPTO.

Hayward, et al., U.S. patent application 09/746,729, "Tandem Robot Control System and Method for Controlling Mobile Robots in Tandem," Dec. 21, 2000 with the USPTO.

* cited by examiner

Robot 1 Disengage

Loose Link

Tight Link

Robot 2 Disengage

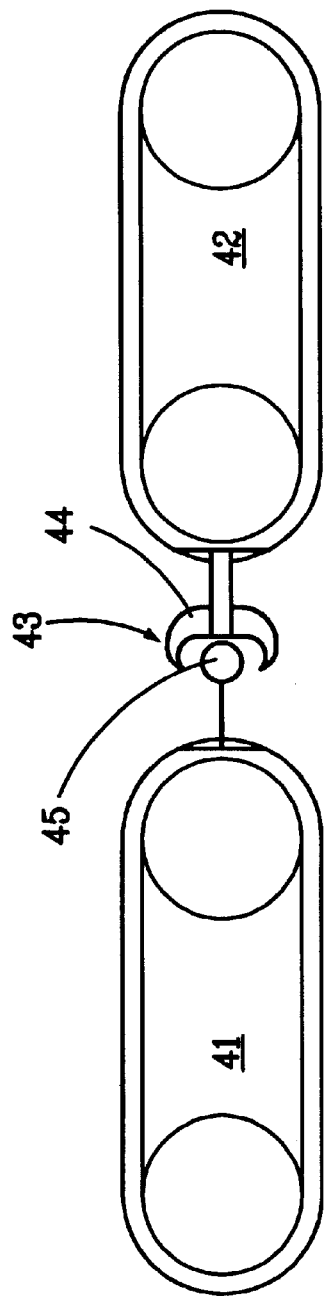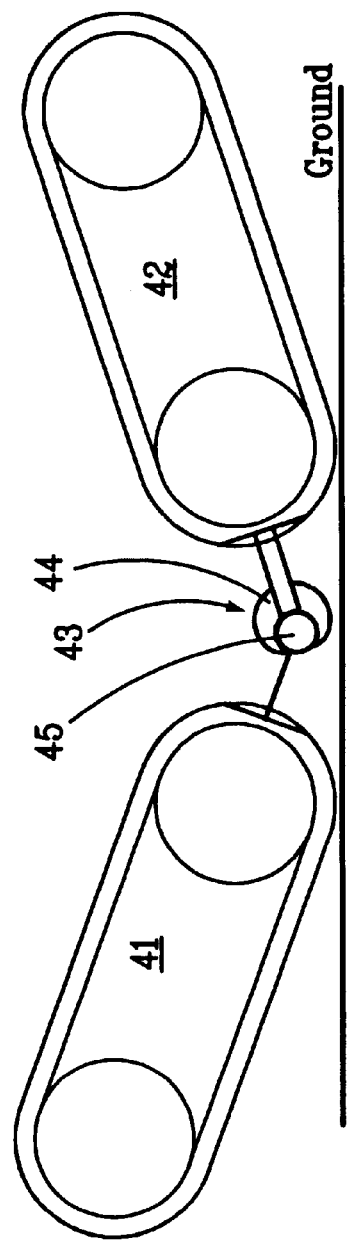
FIG. 4A
FIG. 4B

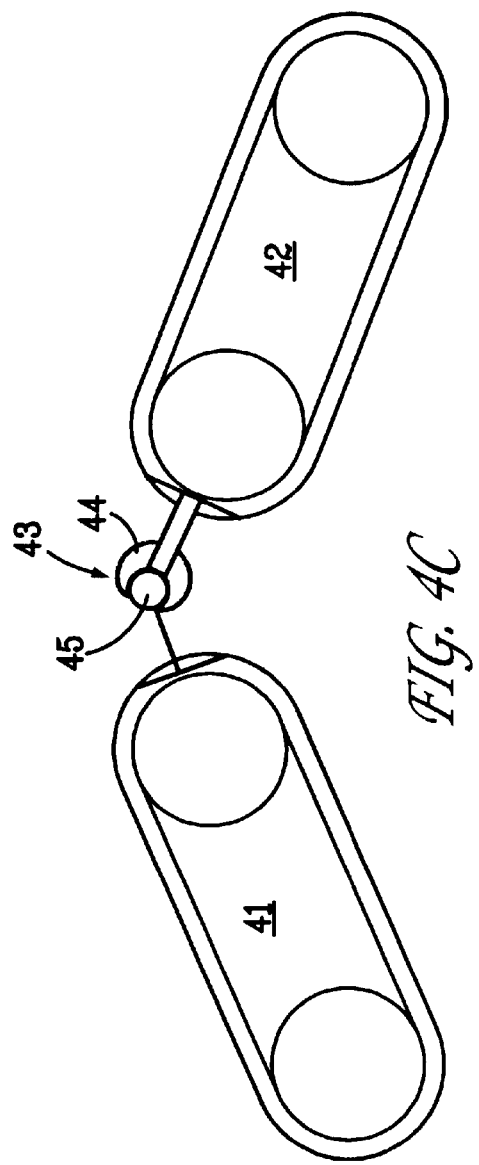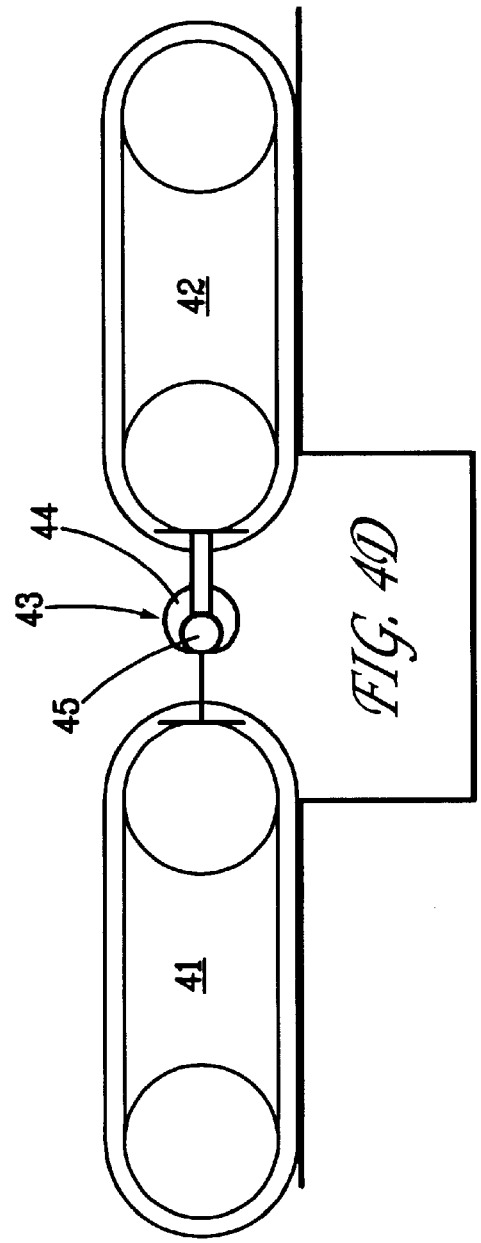

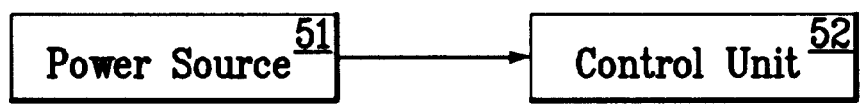
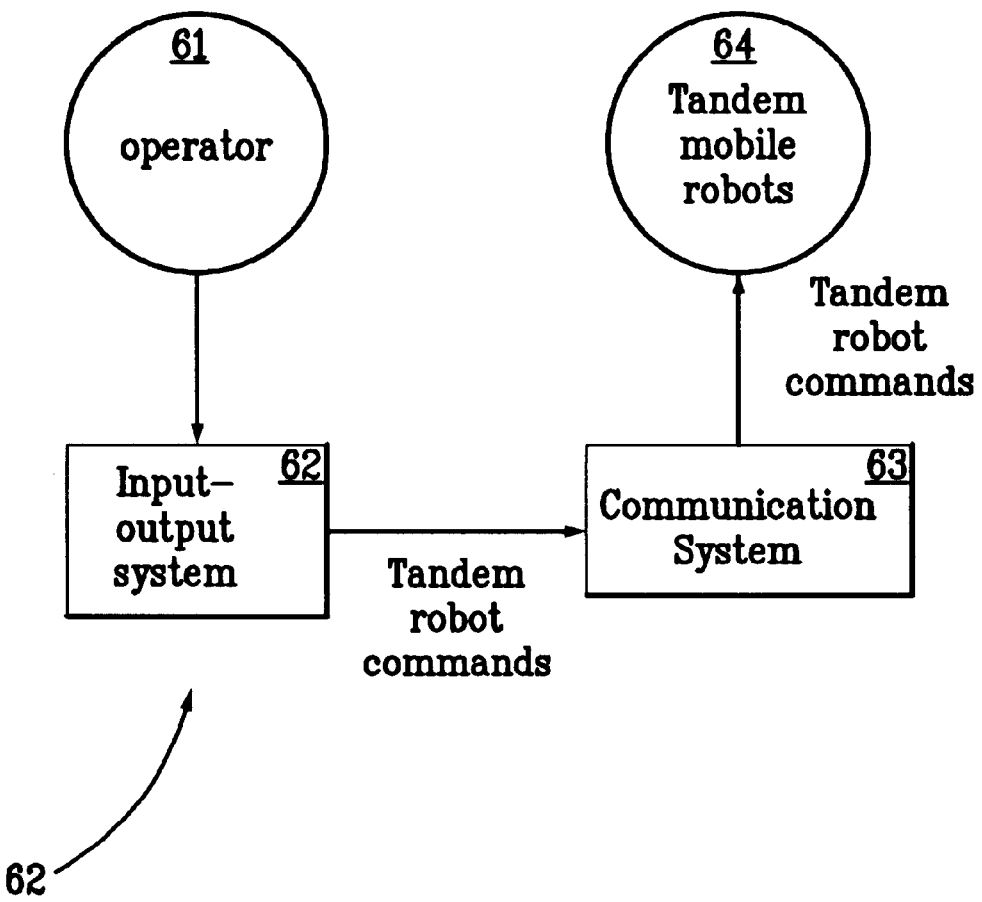

Gemini OCU Diagram

Gemini Mobile Vehicle Control Diagram

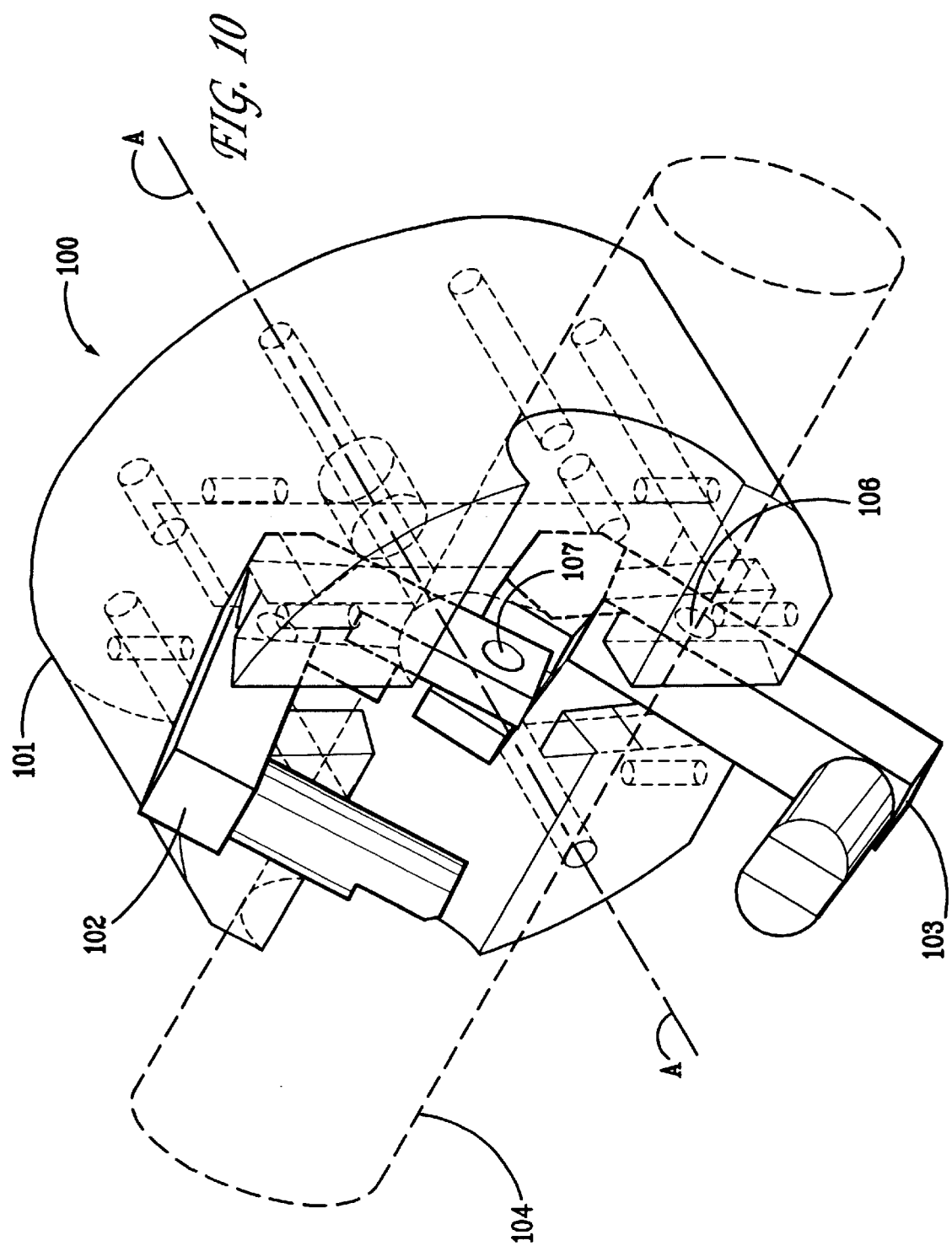

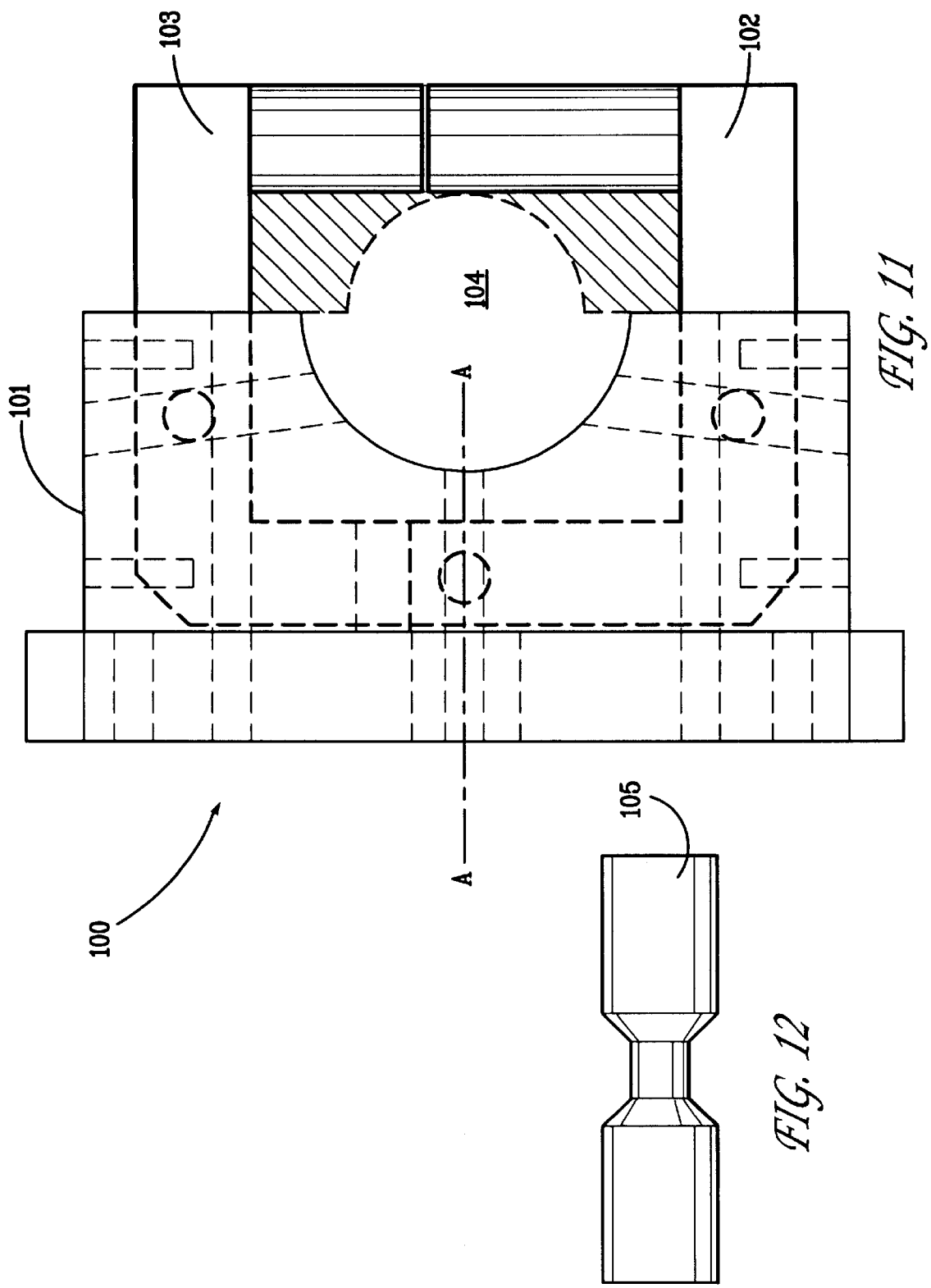

TANDEM MOBILE ROBOT SYSTEM

RELATED PATENT APPLICATIONS

Co-pending, related applications entitled, "Mobility Platform Coupling Device and Method for Coupling Mobility Platforms," Ser. No. 09/746,717, filed Dec. 21, 2000; and "Tandem Robot Control System and Method for Controlling Mobile Robots in Tandem," Ser. No. 09/746,729, filed Dec 21, 2000, all with the same inventors and all assigned to Sandia National Laboratories, have been filed on the same date as this application.

This invention was made with Government support under Contract DE-AC04-94AL85000 awarded by the U.S. Department of Energy. The Government has certain rights in the invention.

This application claims the benefit of Provisional Application No. 60/138,118, filed Jun. 7, 1999.

BACKGROUND OF THE INVENTION

This invention relates to the field of mobile robotics and more particularly to coupled robotic vehicles operated in tandem.

Hazardous or hostile conditions have led to a need to minimize or restrict human presence in the hazardous environment. Mobile robots can be used in a first response to environments containing hazardous chemicals, radioactive substances, unexploded ordnance, and other hazards; in hostile adversary situations such as special forces operations, security force responses, bomb neutralizing, search and rescue operations, and adversary surveillance and monitoring; and in accident scenarios in industries such as mining to serve as a quick-response hazards sensor in synergy with an observation platform. When the hazardous environment also imposes requirements for high mobility or obstacle climbing, as well as a need to overcome communication range limitations and communication blackout situations, robotic control systems need to provide an operator with versatile communications and video options for new generations of mobile robots. In addition, the usefulness of a robotic system can be limited by the terrain it can successfully traverse.

Mobile Robot Systems

Vehicles in mobile robot systems come in varying sizes, from small miniature robotic vehicles (for example, vehicles substantially the size of a paperback book), to approximately ⅓-meter long vehicle platforms, to mid-sized 1-meter long platform robotic vehicles, to even human-carrier-sized robotic vehicles. An example wheeled robotic vehicle is a RATLER™, like those developed by Sandia National Laboratories. See Klarer and Purvis, "A Highly Agile Mobility Chassis Design for a Robotic All-Terrain Lunar Exploration Rover," incorporated herein by reference. A robotic vehicle system generally has a robotic vehicle and a system for controlling the robotic vehicle. See Pletta, "Surveillance and Reconnaissance Ground Equipment (SARGE), Real Robots for Real Soldiers," Sandia Report SAND94-0767C, for presentation at the Fifth International Symposium on Robotics and Manufacturing, Aug. 15–17, 1994, in Maui, HI, incorporated herein by reference; and Amai et al., "Robotic All-Terrain Lunar Exploration Rover (Ratler) FY93 Program Status Report," Sandia Report SAND94-1706, October 1994, incorporated herein by reference.

Mobile robotic vehicles have been operated singly or controlled with group operations, with each individual robotic unit receiving similar control commands, but have not been coupled together and synergistically controlled to take advantage of operation in tandem.

Mobile Robot Control Units

When mobile robots are used in field operations, their robotic control units and peripherals preferably are self-contained and easily human-portable. Available power can be limited due to the need to hand-carry all battery power.

Available portable control units can take the form of hand-held boxes (several versions have been developed by Sandia National Laboratories) and can have a suitcase-like appearance or be carried on a neck-strap. See Pletta and Amai et al. With "backpack robots," both the control units and the mobile robots can be packed and carried by a team of operators to transport the units and robots from position to position.

Computer laptops with added capabilities have been used as control units. Commercially available wearable computers are made by VIA Computers and others. While these computers can be easily portable, they have the capabilities of computers and do not have the integrated capabilities of a control system (for example, reading operator inputs, radio frequency (RF) communications, displaying video from a robot, and other control system capabilities).

There is a need for a robotic vehicle system, of two or more mobile robots working together, that can navigate difficult terrain with high mobility and navigate in closed environments. One example usage is in military special forces' applications where mobile robots can be used in the field in either a repeater mode to extend the communication distance or overcome communications blackout situations, or in a connected mode to provide advanced terrain navigation mobility, or in individual robot control mode. Another example is in explosive ordnance disposal applications where mobile robots (for example, robotic vehicles) can be used to search for and help remove explosives. Accordingly, there is an unmet need for a robotic vehicle system, with separable units working in synergy, suitable for terrain navigation mobility and coordinated search and rescue operations.

SUMMARY OF THE INVENTION

Using two or more mobile robots as either a connected single unit or as individual separated units synergistically working together can meet the need for high mobility is and provide a reduced footprintfor operations in limited spaces. This invention provides a robotic vehicle system suitable for terrain navigation mobility with two or more mobile robots either linked or unlinked and operating together in tandem. A coupling device physically connects the two robots in tandem. The system further comprises a control unit which in its various embodiments, can comprise an input output system with a motion command device and a mode selector, a data transceiver, a video receiver, a video display apparatus, a power source, and a microprocessor.

BRIEF DESCRIPTION OF THE FIGURES

The accompanying drawings, which are incorporated into and form part of the specification, illustrate embodiments of the invention and, together with the description, serve to explain the principles of the invention.

FIG. 4 is a series of coupling detail diagrams for another coupling device embodiment according to the present invention.

FIG. 5 is a simplified block diagram for a control system according to the present invention.

FIG. 6 is a simplified block diagram for a control unit for the control system according to the present invention.

FIG. 10 is a drawing of a coupling device with gripper in an open position according to the present invention.

FIG. 11 is a drawing of a coupling device with gripper in a closed position.

FIG. 12 is a drawing of a coupling device cylinder according to the present invention.

DETAILED DESCRIPTION OF THE INVENTION

This invention provides a robotic vehicle system suitable for terrain navigation mobility with two or more mobile robots either linked or unlinked and operating together in tandem. A coupling device connects the two robots in tandem.

Tandem Robot System

A mobility platform can be a controlled mobile robot, an autonomous vehicle, or any vehicle with mobility through wheels, drive tracks, cogs, or other similar mechanisms. A specific use of this invention is for two or more mobile robots connected by a coupling device and operated synergistically in tandem as cooperating units. The coupling device also could be used for other wheeled or tracked units, for tight link or loose link operations, where one or more of the units is drive-powered.

An individual mobility platform or a single robot can flip over when climbing obstacles having a sharp incline due to longitudinal instability. Performance advantages can be achieved in medium-sized (for example, approximately one meter long platforms) mobile robot vehicles by configuring two or more substantially similar platforms in tandem. Obstacles insurmountable with a single robot can be overcome by adding another robot platform in tandem with the first robot. Coupling two mobility platforms or two robots together can essentially double the wheelbase for increased stability and can provide cooperation between the two units for coordinated push-pull, stability, and increased terrain agility. Mobility can be improved with the pushing, pulling, stabilizing forces that a second robotic vehicle adds. In prototype demonstrations of the present invention, a tandem robotic vehicle climbed stairs and drove over obstacles, at over a 45 degree incline, and rough terrain insurmountable for a single robotic vehicle.

Figure 1:
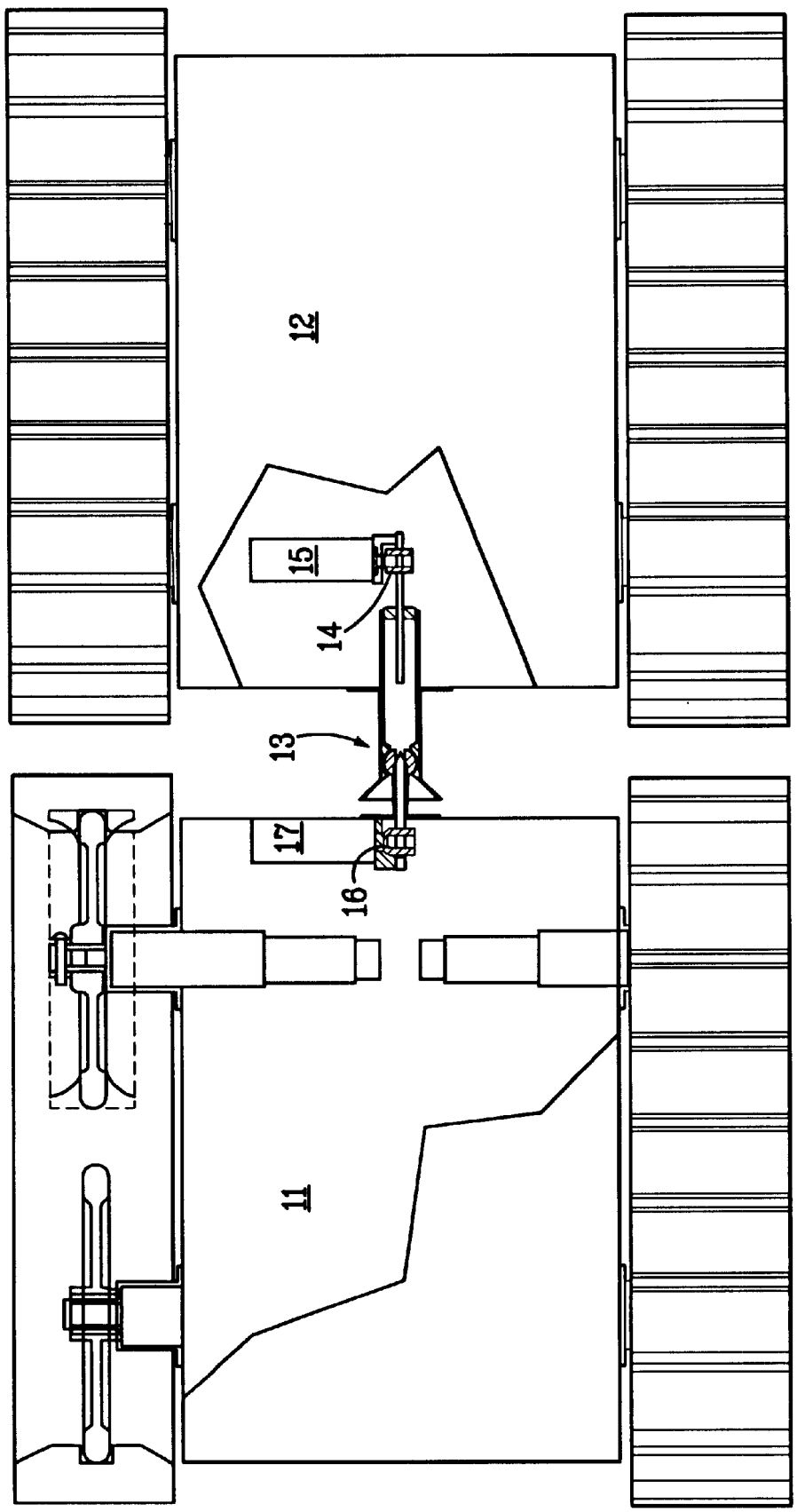
FIG. 1 is a top view of two robots coupled together with a pivot to form a robotic vehicle system according to the present invention.
Figure 2:
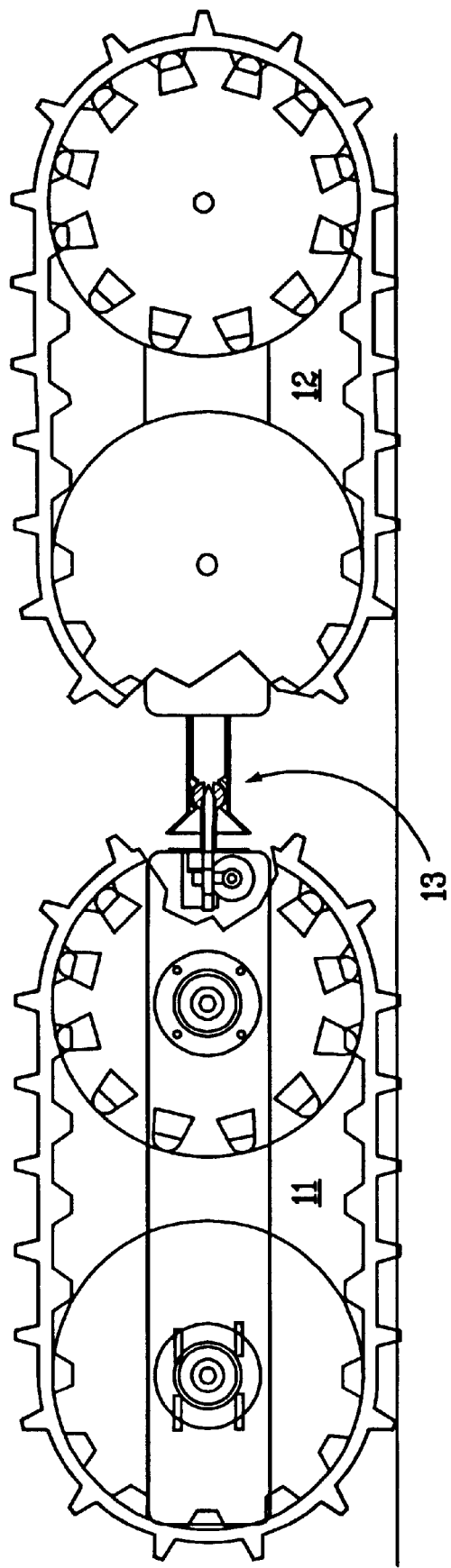
FIG. 2 is a side view of two robots coupled together with a pivot to form a robotic vehicle system according to the present invention.
Figure 3A:
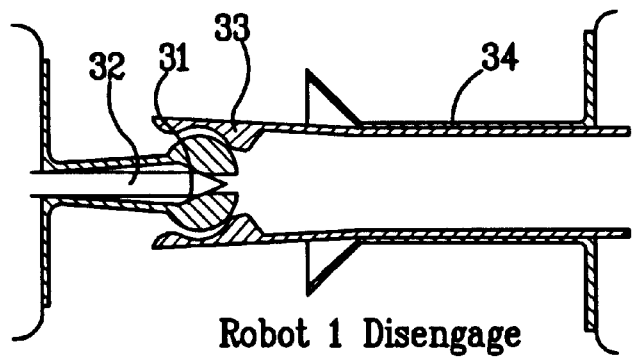
FIG. 3 is a series of coupling detail diagrams for one coupling device embodiment according to the present invention.
Figure 3B:
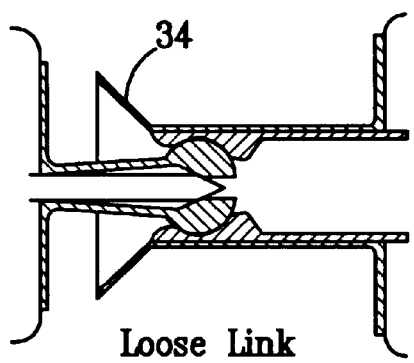
Figure 3C:
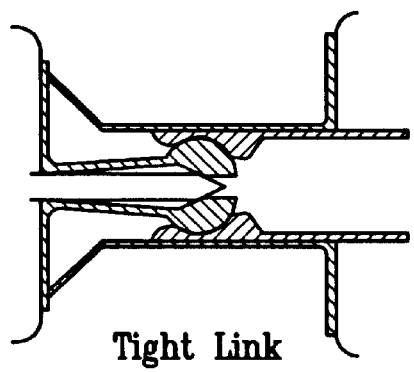
Figure 3D:
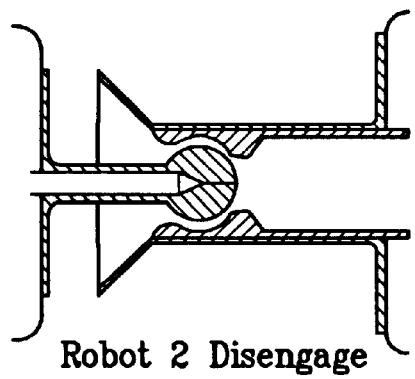

FIG. 1 shows a top view of two robots coupled together with a coupling device to form a robotic vehicle system. Robotic vehicle system 10 comprises robot 11 and robot 12, operably connected in tandem by coupling device 13. Gears 14,16 driven by gear motors 15, 17 can actuate coupling device 13. Each robotic vehicle, robot 11 and robot 12, can have dual drive tracks, or multiple drive wheels, for terrain navigation, as is well known in the art. FIG. 2 shows a side view of robot 11 and robot 12 coupled together with coupling device 13 to form robotic vehicle system 10.

Each of two or more robots 11,12 can have a data radio and a video link with control algorithms to control and coordinate data and video transmissions to avoid data and video contention and transmission conflict. An operator can select video for viewing from either robot 11 or robot 12. Commands from a control unit are received by both robots 11,12 and processed by control algorithms to accomplish coordinated steer maneuvers (for example, skid steering), coupling device linking and unlinking, motion, video, and other action commands. Status and sensor information from each of robots 11,12 can be sent to the control unit.

Coupling device 13 can be passive or active (i.e., actuated). Passive coupling provides a loose link and permits movement at the coupling device between robots 11,12. For passive coupling, a control system controls vehicle steering with methods which can include: simultaneous linked skid steering for both robots 11,12; proportional speed control of left and right motors on a front robot (for example, robot 11); and proportional speed control of left and right motors on both robots 11,12. (In skid steering, the wheels on one side of robot 11,12 can turn in one direction, while the wheels on the other side of robot 11,12 turn in the opposite direction in order to turn robot 11,12. Alternately, the wheels on both sides of robot 11,12 can turn in the same direction with differential speed, with one side's wheels turning at a faster rate than the other side's wheels.)

Active coupling provides a tight link and restricts or limits movement at the coupling device between robots 11,12. Gears 14,16 driven by gear motors 15, 17 can actuate coupling device 13, shown in FIG. 1. In both the embodiment shown in FIG. 3 and in the embodiment shown in FIG. 4, a coupling device can be a powered joint controlled by software to configure the robots for increased maneuverability (for example, in a V-shape, an inverted-V-shape, and locked in a linear-shape). Various maneuverability configurations are shown in FIG. 4 for the second embodiment with coupling device 43 and robots 41,42. For active coupling, the control system allows steering methods which can include: steering by actuating the horizontal axis of coupling device 13, and steering by actuating the vertical axis of coupling device 13 while tipping the front and rear of robotic vehicle system 10 off the ground (e.g., in a V-shape) to allow skid steering with reduced turning friction and a reduced overall wheelbase of robotic vehicle system 10. A tight link in a horizontal configuration can provide a rigid overall platform for traversal of terrain chasms.

When robotic vehicle system 10 is uncoupled, each of robots 11,12 can be selected and operated as independent robotic vehicles to allow cooperative and independent actions. For example, failure and damage redundancy can be achieved by unlinking a damaged or failed robot and continuing a mission with a surviving robot controlled in individual mode. Unlinked, cooperative actions with robots 11,12 can include: coordinated manipulation using one or both of robots 11,12 as manipulator arm bases; positioning one of robots 11,12 at an observation position to provide a video perspective for manipulation or other actions of the second of robots 11,12; and positioning one of robots 11,12 at a location in communication with an operator and placing it in repeater mode to relay information to the second of robots 11,12 in an RF drop-out area in non-line-of-sight conditions, use of video from either of robots 11,12 by an operator to serve as the driving video for teleoperation, then switching roles between robots 11,12 to drive the second of robots 11,12 through the RF drop-out area, and relinking robots 11,12 into single robotic vehicle system 10.

When more than two robots 11,12 are linked to accomplish complex tasks, they can be operated in a train-mode where the steering of the first robot is controlled and all follower robots follow in the path of the first robot. In addition, automonous navigation systems and methods can use improved terrain agility in robotic vehicle systems.

Robot 11 and robot 12 can have similar platforms comprising paired wheels, coupled with treads and a body suitable for navigating difficult terrain and suitable for carrying various payloads such as monitoring and surveillance equipment, sensors, video cameras, and other equipment needed in potentially hazardous environments.

As an example, in the embodiment shown in FIGS. 1 and 2, each robot can have dual tracks for increased maneuverability in difficult to navigate terrain. Flexible tracks can provide improved traction. A good tread design is that used by Honda for a snowblower. See Takeuchi et al., U.S. Pat. No. 6,000,766 (1999), incorporated herein by reference; drive track shown on Honda Two-Stage Snowblowers' information sheets, incorporated herein by reference.

Tandem robot system functions can include, but are not limited to, the following: a repeater mode to allow one unit to act as a data/video repeater to provide much longer distance ranging and to minimize RF blackouts; and a modular concept to allow quickly configuring a robot with different payloads to accommodate a particular mission profile.

Coupling device 13 can be engaged and disengaged to provide both coupled and de-coupled robot operations. Coupling device 13 can provide a loose link for coupled operations with rotation at the link (for example, vertical rotation and lateral rotation). Coupling device 13 can provide a tight link for coupled operations with essentially no movement at the link. FIG. 3 shows a series of coupling detail diagrams for one coupling device embodiment. FIG. 4 shows a series of coupling detail diagrams for a second coupling device embodiment.

Decoupled robot operations can overcome line-of-sight communications difficulties. When the communication medium between a control system and robots 11,12 is line-of-sight RF, communications can be lost traveling beyond line-of-sight into a deep depression or into a building. In decoupled operations, one robot can act as a repeater and remain within line-of-sight of the control system and can relay messages to the second robot. The relayed communications also can be used to extend the range, to nearly twice the maximum range, of one of robots 11,12 by separating robots 11,12 and relaying radio signals from the robot within communication range of the control system to the second, more distant robot. Teleoperation (i.e., remote control using video feedback to an operator) of robots 11,12 can be used to enable robot access to previously impossible locations.

Decoupling operations and remote decoupling operations can allow the operator to separate robots 11,12 if one of robots 11,12 becomes disabled and to continue the mission with the remaining robots 11,12. Robotic vehicle system 10 also can be decoupled whenever the coupled system is too large to navigate terrain (for example, tightly spaced trees, small turns in hallways), but individual robots 11,12 can succeed.

A modular design for robotic vehicle system 10 can allow quick configuration of robots 11,12 with different payloads to accommodate a particular mission profile without costly time delays. For example, one of robots 11,12 can have a manipulator arm and use it to deploy a package from another of robots 11,12. As another example, a fixed, on-board camera can be interchanged with a special multi-feature camera for advanced viewing capabilities. Other mission specific payloads can be accommodated.

Robots 11,12 of robotic vehicle system 10 have been implemented as several different prototype versions, each with slightly different dimensions, and each having a metal body, substantially in the shape of a cube, driven by dual tracks. An alternative to the metal body can be a carbon fiber graphite molded chassis for weather protection, such as waterproofing.

Tandem Robot Coupling Device

Coupling device functions can include, but are not limited to, the following: remote de-couple/couple; powered pivot to lock two tandem units in a fixed position for improved control of skid steering, gap spanning, and mobility.

FIGS. 3($a,b,c,d$) shows a ball and socket configuration for a coupling device. The ball and socket embodiment can essentially maximize angular motion of a robot 11 platform relative to a robot 12 platform. To restrict unwanted directional movement, strategically located mechanical stop-positions can be added, or a software-controlled powered device with continuous stops can be implemented and controlled using position information from coupling device 13. For example, relative angular motion in the horizontal plane must be limited to prevent vehicle tracks or wheels on robot 11 from rubbing against those on the robot 12. As another example, powering coupling device 13 to hold a fixed position can provide navigation maneuverabilty benefits such as the following: robotic vehicle system 10 can climb stairs more easily by holding coupling device 13 fixed in a level plane between robots 11,12; skid steering can be accomplished more easily, and use less power, by raising both ends of robotic vehicle system 10 to approximate a fixed position V-shape while skid steering; some difficult terrain can be more easily navigable by powering coupling device 13 in a high center position to approximate an inverted-V-shape with robotic vehicle system 10.

Cylinder 34 is a fixed tube (for example, a sleeve) that can slide over socket 33, which surrounds ball 31 in a linked configuration, as shown in FIGS. 3($a,b,c,d$).

Cylinder 34 can be actuated by gears 14 (shown in FIG. 1) driven by gear motors 15 (also shown in FIG. 1). Ball 31 is split; and, rod 32 can be inserted and removed from ball 31 to engage and disengage the coupling device. Rod 32 can be actuated by gears 16 (shown in FIG. 1) deiven by gear motors 17 (also shown in FIG. 1). The ball and socket separation can be controlled from either vehicle. For example, ball 31, mounted with robot 11, can shrink by withdrawing rod 32, mounted with robot 11; or, socket 33, mounted with robot 12, can enlarge by sliding back and withdrawing cylinder 34, mounted with robot 12. Cylinder 34 also can restrict motion between robots 11,12 by varying the distance between robots 11,12 to form tight links and loose links, sliding cylinder 34 over socket 33, as shown in FIG. 3. In a tight link, cylinder 34 contacts robot 11 to restrict movement at the coupling device.

To provide required strength for small components, critical pivot parts (e.g., ball 31, rod 32, socket 33, and cylinder 34) are made of heat-treatable stainless or chromium alloy steel, for example. Close tolerances, fine finishes, and lubrication are required to prevent binding while coupling or uncoupling. Due to extreme strain on the ball and socket coupling device, the materials used must be selected for strength.

FIGS. 4(a,b,c,d) shows a gripper and cylinder configuration for a coupling device. The gripper and cylinder embodiment permits vertical motion between robots 41,42 but does not allow horizontal motion between robots 41,42. Coupling device 43 comprises gripper 44 and cylinder 45. Gripper 44, mounted with robot 41, can grip around cylinder 45, mounted with robot 42, to connect robots 41,42. Coupling device 43 can be moved to fixed positions and locked to form a tight link. FIG. 4a shows gripper 44 disengaged from cylinder 45. FIG. 4b shows gripper 44 in a tight link with cylinder 45 substantially in a V-shape, forming a reduced footprint and a smaller turning radius, for example, for skid steering the tandem robotic vehicle. FIG. 4c shows gripper 44 in a tight link with cylinder 45 substantially in an inverted-V-shape with a raised center for clearing obstacles and forming a reduced footprint. FIG. 4d shows gripper 44 in a tight link with cylinder 45 in a linear-shape for spanning and traversing chasms. As discussed above, coupling device 43 can be moved into various configurations, controlled by software as a powered joint, to form the robotic vehicle system into a V-shape, an inverted-V-shape, and a linear-shape. Servos can be used to move a mechanical actuator that can be electrically driven (for example, screws to push against a surface like a barrel) and controlled by software to lock coupling device 13, 43 into position. A commercially available device are electric actuators manufactured by Warner.

Control of Multiple Robots

FIG. 5 is a simplified block diagram showing control system 50 according to the present invention. Control system 50 comprises a control unit 52 and a power source 51, connected to power control unit 52. Power source 51 and control unit 52 are preferably sized to be carried by an operator.

A tandem mobile robot system comprises at least two mobile robots and a control system. Control system 50 provides user command input from an operator and communicates commands to the tandem mobile robots. Control system 50 can comprise one or more elements in control unit 52 (for example, an input-output system (with a motion command device and a mode selector), a communication system (with a control unit data transceiver and a video receiver), a video display apparatus, and a microprocessor) and a power source (for example, a battery or battery pack) to supply power to control unit 52. All elements of control unit 52 are portable by an operator.

FIG. 6 is a simplified block diagram showing elements of control unit 52 of control system 50 according to the present invention, comprising input-output system 62 and communication system 63. Input-output system 62 can be adapted to receive input from operator 61 and generate tandem robot commands. Communication system 63 can be adapted to transmit the tandem robot commands to two or more tandem mobile robots 64. Tandem commands can be synergistic and coordinate movements of each robot (for example, linked skid steering both robots simultaneously). Tandem commands can be cooperative (for example, coordinated manipulation using two robots as bases for manipulator arms, controlled separately). Tandem commands can be supportive between two robots (for example, one stationary robot in a repeater mode relaying commands to another robot moving through an RF black-out area). Identical tandem commands can be acted on by all robots (for example, movement through terrain).

Figure 7:
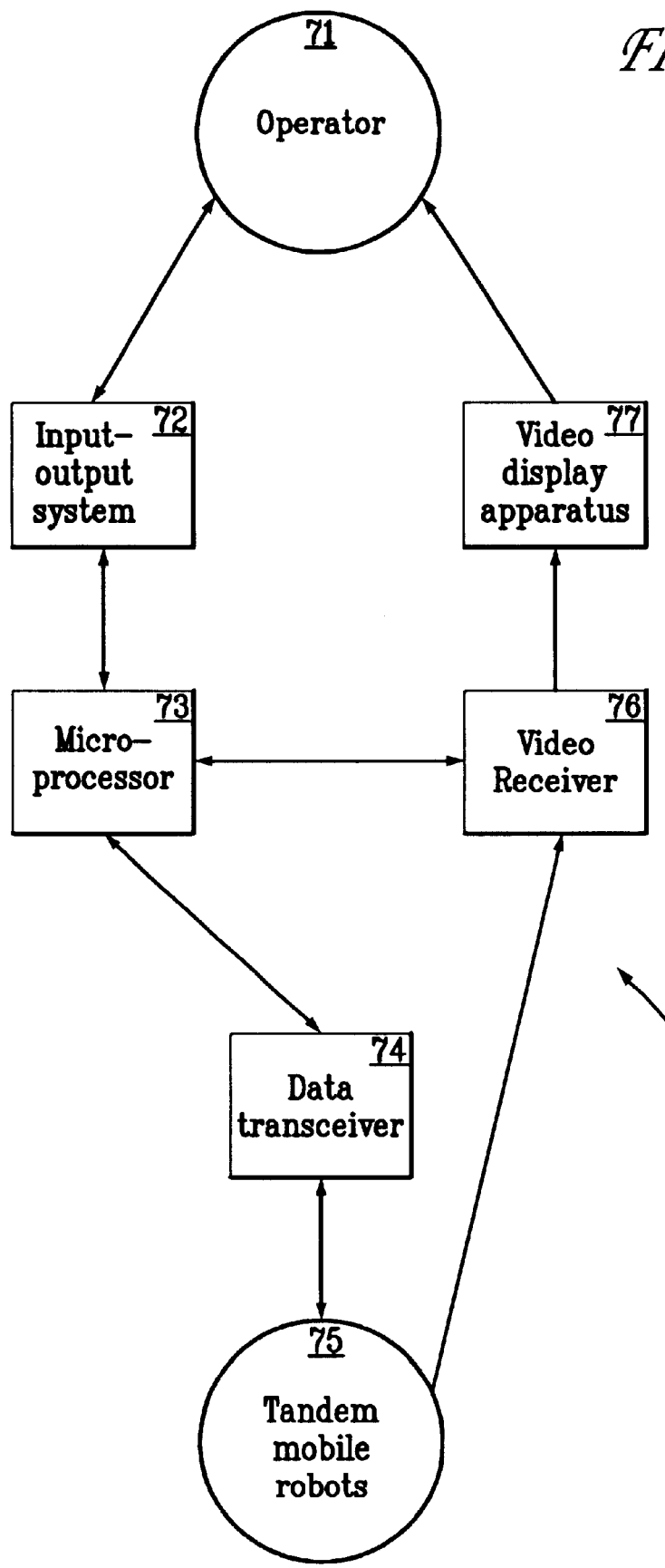
FIG. 7 is a block diagram for a tandem mobile robot control system according to the present invention.

FIG. 7 is a block diagram showing tandem mobile robot control system 70 according to the present invention. Various elements of a control unit (for example, control unit 52 in FIG. 5) are shown in FIG. 7. Input-output system 72 can receive input from operator 71. Input-output system 72 can comprise a motion command device, for generating single- or multi-axis tandem robot commands proportionally responsive to input from operator 71, and a mode selector, for receiving mode-input from operator 71 and modifying operation of control system 70. Commands can be processed by microprocessor 73, then transmitted by data transceiver 74 to two or more tandem mobile robots 75. Each tandem mobile robot 75 can have its own data transceiver that is compatible with the control unit's data transceiver 74. Each tandem mobile robot 75 can also have its own peripherals such as a video unit, a video transmitter, a communications repeater, a chemical sensor, an explosives detector, and various other devices useful in robotic applications and known to those skilled in the art. Each tandem mobile robot 75 can transmit its information (for example, video inputs, queries to the control unit, or information such as search results needing to be relayed back to the control unit) back to data transceiver 74 for processing by microprocessor 73 or receipt by video receiver 76. Data transceiver 74 can transmit and receive data which also can include video. Video information can be displayed by video display apparatus 77. Video display apparatus 77 can include, but is not limited to the following: a video/data display device, a computer display device, a personal video display apparatus or heads-up device worn by operator 71, a television display, and any other apparatus capable of video and/or data display. The video information also could be displayed on input-output system 72.

As an example, the motion command device of input-output system 72 can be used to generate forward-backward and left-right directional commands and various gradations between the directional commands. The motion command device can be combined with a mode selector to modify operation of control system 70. For example, the mode selector can be a computer touch screen where operator 71 can select operational robot modes. One mode can be for directional commands for any single robotic vehicle in a tandem mobile robot system. Another mode can be for directional commands for the tandem mobile robot system in a linked configuration. A third mode can be for pan, tilt, zoom, and other operations commands for a video camera. Similarly, other modes can be combined with the motion command device to control various other peripherals or can be encoded to power various peripheral systems on and off. Once operator 71 has selected a mode with the mode selector, then various commands can be implemented with the motion command device or input-output system 72.

Mobile robot control input-output system 72 can be a self-contained device, for single-handed operation, that is not mounted into a base. The motion command device can be a joystick, a handgrip electronic-game-type control device, a two-axis tilt sensor, a directional button or control pad as on a laptop computer for a continuous spectrum of forward-backward and left-right directional commands, and other similar interface devices. Commercial devices are available. This type of device can allow the operator to input proportional driving and control commands using only one hand. The operator commands can indicate multi-axes where a joystick position between "forward" and "right" can be interpreted as a direction between straight ahead and a right turn. Operator commands can indicate proportional motion where a fast change of direction using the joystick can indicate a high speed for the mobile robot.

Data transceiver 74 can be used to transmit and receive data. One example is a data radio with low power usage. Both tandem mobile robots 75 and control system 70 can have complementary data radios and antennae to facilitate bi-directional data transmissions. Suitable data radios are commercially available. There can be two RF links: one for data and one for video. Alternately, there can be one link for both data and video. The video can be displayed over video display apparatus 77 or displayed over input-output system 72.

A data radio can communicate data and a robot video unit can send video inputs from a camera on the mobile robot to a video receiver. The robot video unit can both transmit and receive video and audio. Video receiver 76 with antenna can receive video inputs from a camera and a compatible video transmitter on-board mobile robot 75 and send video image to video display apparatus 77 worn by operator 71. Video receiver 76 can receive video directly from a video transmitter on mobile robot 75 or can receive video received by data transceiver 74 on the operator's control unit.

Video display apparatus 77 can be a personal video display unit mounted on glasses worn by operator 71. A head-mounted display in the form of video glasses is one example.

Battery power can be needed to power peripherals used in control system 70. A portable battery or battery pack can be light enough for an operator to carry. Portability can be provided in various embodiments worn by operator 71.

Microprocessor 73 can use serial input/output (for example, RS232) to talk to data transceiver 74 (for example, a data radio), video receiver 76, and to receive inputs from input-output system 72 (for example, analog inputs received from a joystick or other robot control input device).

Changes can be made in microprocessor 73 software to accommodate new mobile robots. In an example embodiment, a communication protocol can comprise commands for the following: control of left and right mobile robot motors (graduated speed and direction), coupling commands to link multiple robotic vehicles together, de-coupling commands to separate linked robotic vehicles, video camera pan/tilt, and auxiliary on-off to drive opto-isolators to control power to auxiliary devices such as a laser or to turn a video system on and off to conserve power.

Example Embodiment

In the demonstration embodiment, an example control unit was used to control a mid-sized version of a tandem robotic vehicle. Controller software, a limited instruction set communications protocol, extended for linked operations, a coupling device, individual robots, and a printed circuit board design were developed at Sandia National Laboratories; all other components were commercial products purchased off-the-shelf. In the as-built example, each individual robot was approximately 39×13×7.5 inches, had a 10.5 inch wheelbase, weighed 90 pounds with an aluminum body, and had two two-track drives, with an approximate speed of 3 feet per second. Using a sealed lead acid battery, the battery provided approximately 4 hours of continuous operation yielding a vehicle range of greater than 1 kilometer. The demonstration tandem robotic vehicle climbed obstacles approximately 18 inches high, climbed inclines as steep as 50 degrees, and spanned gaps approximately 16 inches, depending on the rigidity and looseness of the surrounding material. The demonstration vehicle had a ground clearance of 3.5 inches.

Figure 8:
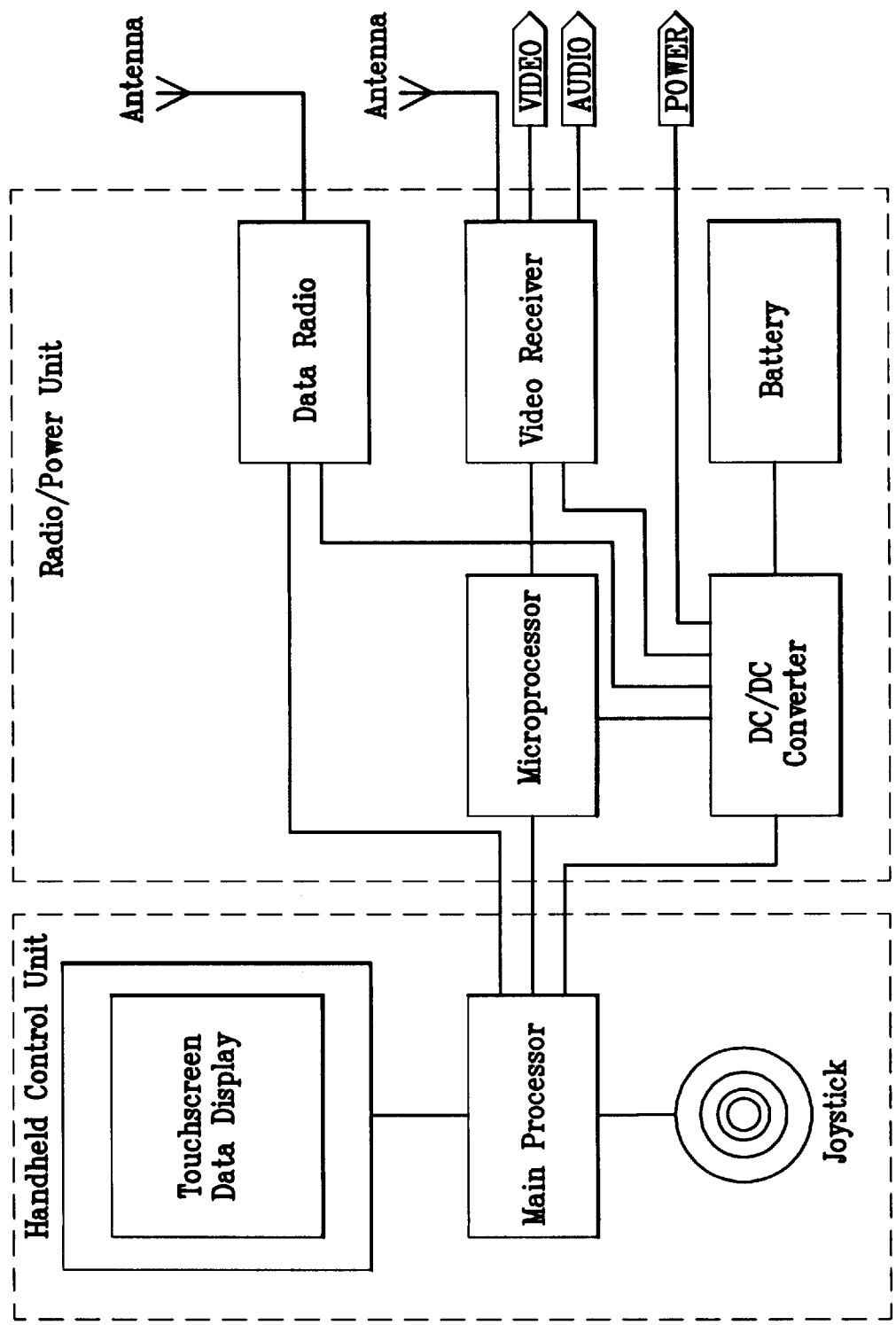
FIG. 8 is a simplified operator control unit connection diagram for the system elements used in an implemented embodiment of a tandem control unit according to the present invention.

FIG. 8 is a simplified operator control unit connection diagram for the system elements used in an implemented embodiment of a tandem control unit according to the present invention. Those skilled in the art could use the diagram, combined with the discussion that follows, to build an operator control unit for a tandem robotic vehicle system. Once a practitioner skilled in the art has selected a microprocessor along with input-output system and communication system elements, the practitioner could use electrical design skills to design the layers and connections of a printed circuit board.

Figure 9:
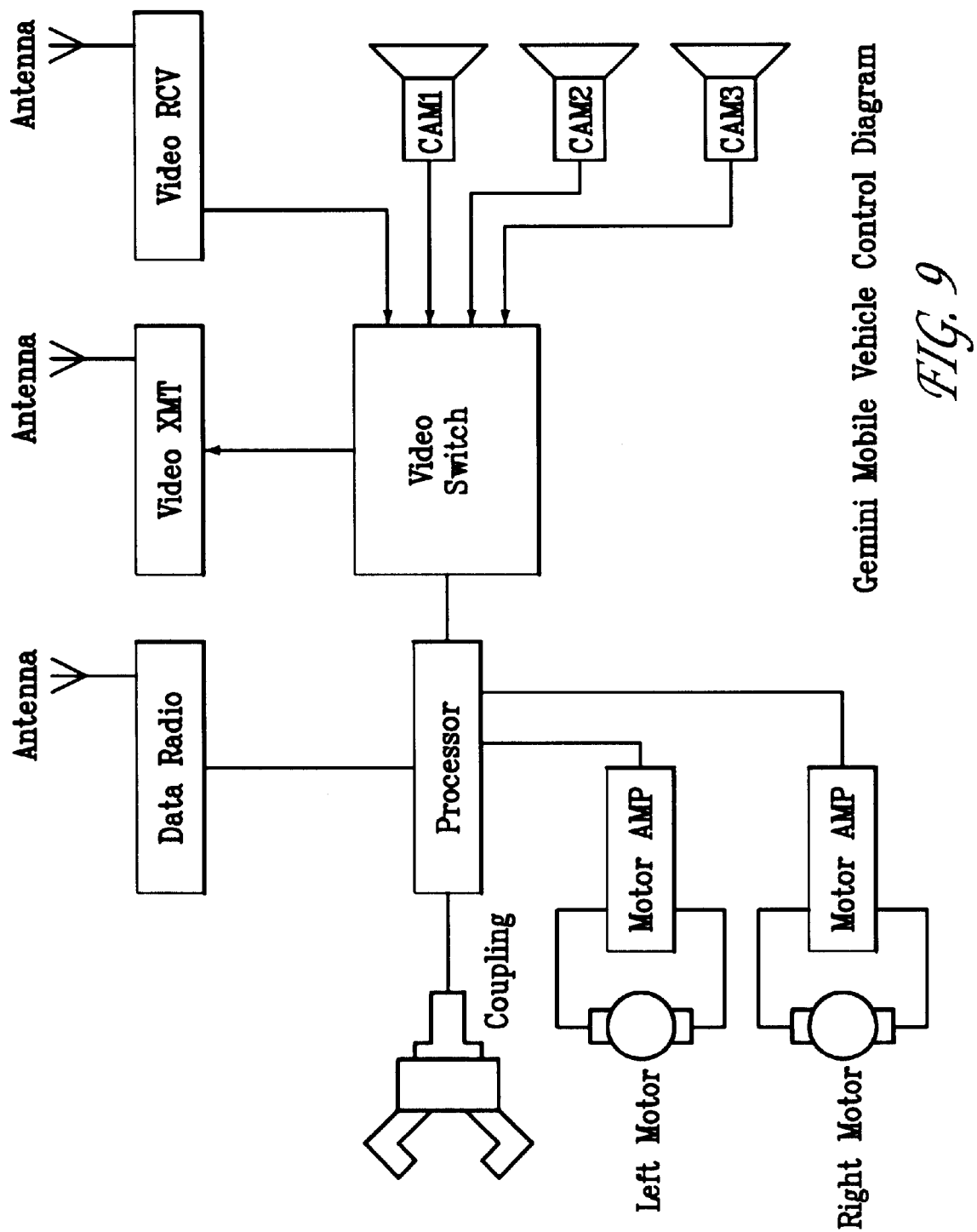
FIG. 9 is a simplified control and connection disgram used in an implemented embodiment of a tandem mobile vehicle according to the present invention.

In the implemented OCU control system embodiment shown in FIG. 8, there were two RF links: one for data and one for video. The video had a selectable communication frequency of 1.728 to 1.845 MHz @ 2 W, while the data was a spread spectrum radio at a frequency of 902–928 MHz @ 1 W. The data was capable of bi-directional communication. The box marked "video XMT" in FIG. 9 was the video transmitter on the robotic vehicle. The box marked "video RCV" in FIG. 9 was the video receiver on the robotic vehicle. The video also can have audio. FIG. 9 also shows a processor controlling coupling device, left motor, and right motor of a mobile vehicle.

Specific elements used in the example embodiment of the control unit are discussed in the context of the block diagram given in FIG. 7.

FIGS. 10–14 give additional detail to the coupling device shown in FIG. 4. FIG. 10 is a drawing of a coupling device with gripper in an open position according to one embodiment of the present invention. Coupling device 100 comprises coupling housing 101 and two coupling jaws 102 and 103. Coupling jaw 103 is mounted with coupling housing 101 and held with pins at pin positions 106,107. When a cylinder (not shown) is pulled to the right of FIG. 10 along axis A—A, coupling jaws 102, 103 can move to a closed position around cylinder 104.

FIG. 11 is a drawing of a coupling device with gripper in a closed position. Coupling device 100 comprises coupling housing 101 and two coupling jaws 102, 103 mounted with coupling housing 101. When a cylinder (not shown) is pushed to the right of FIG. 11 along axis A—A, coupling jaws 102, 103 can move to an open position to release the grip around cylinder 104.

FIG. 12 is a drawing of an alternate coupling device cylinder according to the present invention. Cylinder 105 can be notched toward the middle of the cylinder to provide a closer fitting of coupling jaws 102,103 around cylinder 105.

Figure 13:
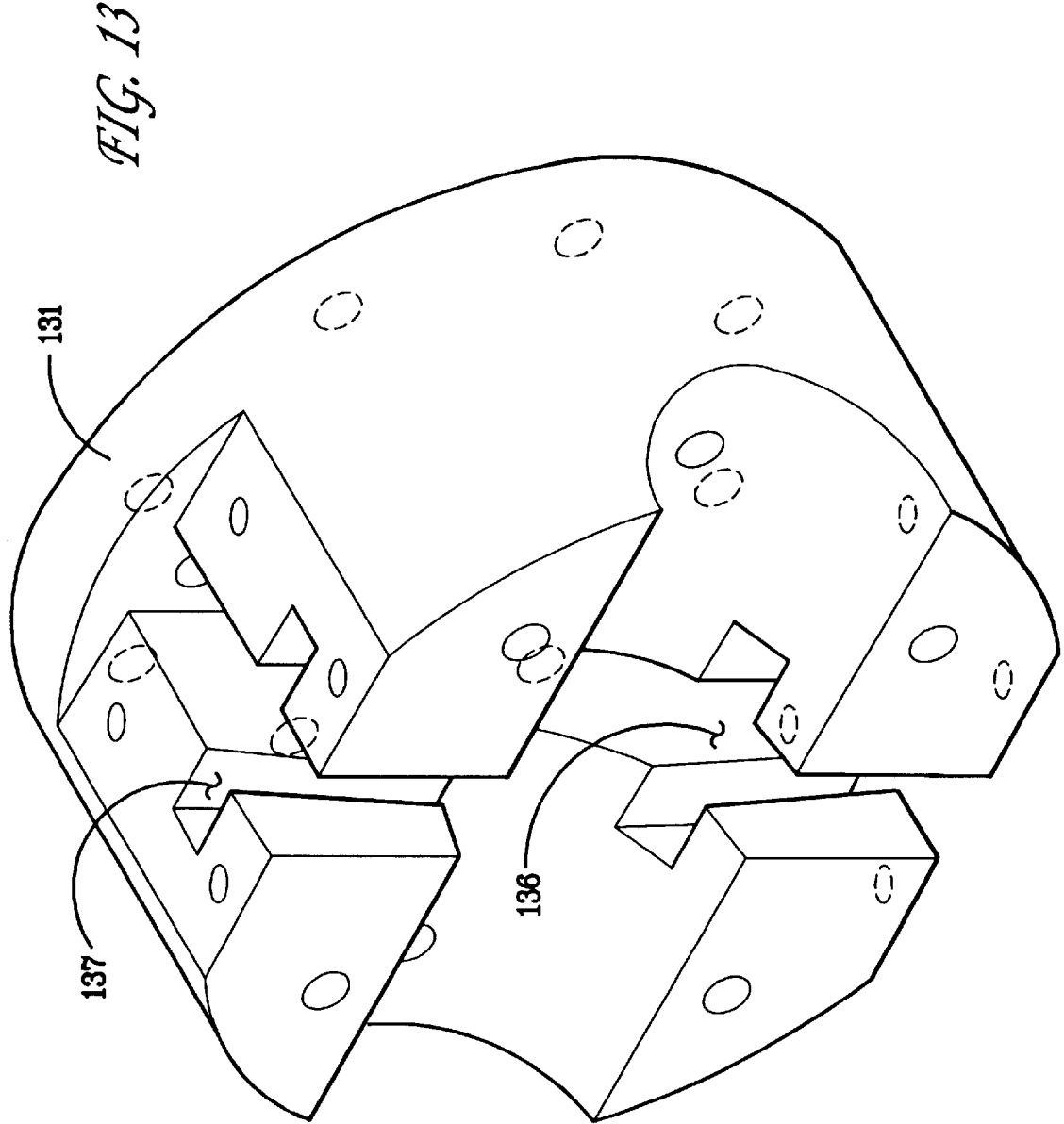
FIG. 13 is a drawing of a coupling housing of a coupling device according to the present invention.

FIG. 13 is a drawing of a coupling housing of a coupling device according to the present invention. Coupling housing 131 has slots 137 and 136 for mounted coupling jaws with coupling housing 131. An actuator with gears and gear motors can be mounted with coupling. housing 131 at the right of FIG. 13 to actuate coupling jaws.

Figure 14:
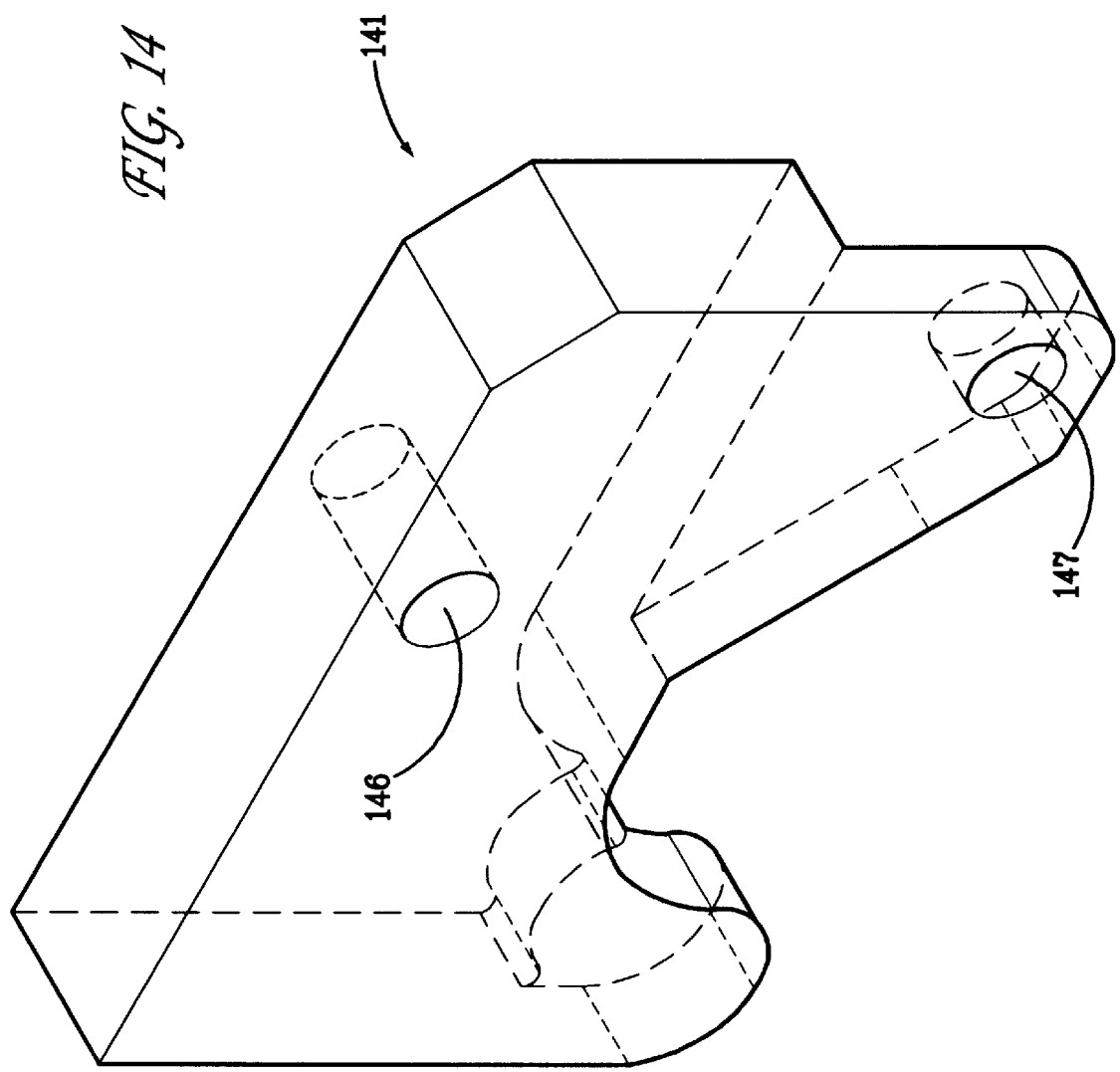
FIG. 14 is a drawing of a coupling jaws of a coupling device according to the present invention.

FIG. 14 is a drawing of a coupling jaws of a coupling device according to the present invention. Coupling jaw 141 can be mounted with coupling housing. 131 and held with pins at pin positions 146,147 and actuated with push-rods (not shown). This embodiment of coupling jaw 141 is curved at the corner of the jaw to provide increased surface contact around a cylinder (for example, cylinder 105 shown in FIG. 12.)

Freewave model # DGR-09RAF spread spectrum data transceivers were used for data transceiver 34 shown in FIG. 7. These units have a data communication frequency of 902–928 MHz @ 1 W spread spectrum. There was one unit in each of the robots joined with a coupling device and one unit in an operator control unit to be the data communications links for the data radios. (See FIGS. 8 and 9.) Similar units, for example, Digital Wireless, WIT2400 model, spread spectrum data radios and Xetron, Hummingbird model, spread spectrum radios could be used. Other suitable data radios known to those skilled in the art can also be used. The data radios were chosen for their small size, lightweight, low power consumption, a data transmission range of at least 1 km, and a data transmission rate of 9600 baud, with about 100 milliwatt or better for transmit power. The receiver on each robot receives information from the operator control unit (OCU), transmits information to its linked companion robot in a repeat mode, and sends status information back to the OCU.

For video capability, a transmitter and receiver pair was used in each robot in a robotic vehicle system, and another receiver was used in the operator control unit. The receiver on a robot and its companion transmitter on the other robot are tuned to the same frequency. Each unit repeats messages from the OCU. The frequency for each vehicle was manually selectable in the demonstrated embodiment, with transparent RF data repeating. Thus, three communication modes were implemented in the prototype: communication with robot 11, communication with robot 12, and communication to both robots 11 and 12. The video transmitters used in the demonstration embodiment were Southern California Microwave model VT05L-2A/SC transmitters. The compatible video receivers 76 used in the demonstration embodiment were Southern California Microwave model VR20-LA/SC receivers. Similar units having a small size and preferably greater than 500 milliwatt transmit power could be used with appropriate setups; for example, Southern California Microwave, model VT051 with VR20LA; DELL STAR DSX1800 with DSR1800; or DELL STAR DSX2400 with DSR2400. In an implemented embodiment, for each robot, video could be selected among four video sources: three camera sources and the receiver video in each robot. (See Cam1, Cam2, Cam3, and Video RCV in FIG. 9 from which "video switch" can select.) The implemented robotic vehicle with two robots had six cameras total. Thus, an operator can select any video source from a robot or, in repeat mode, can select any video source from the other robot. Cameras manufactured by NSI Nevada Systems, Inc. can be used. A NSI-6000C color camera has 3 lux sensitivity, 330 lines resolution, 6 to 15V DC operation, with a mounting bracket and AC power adapter.

Selection criteria for video display included: light-weight, hands-free usage, mounted on the body, on glasses, or on a ballcap, useable in sunlight, and not transmitting extraneous light at night. Since laptops transmit light that can be easily visible at night, a personal video display was selected for video display apparatus 77. Video display apparatus 77 used in the demonstration embodiment was a clip-on video display monocle that could be attached to a ballcap or a pair of glasses. A clip-on display monocle manufactured by MicroOptical Corp was used in the prototype embodiment. Virtual I/O's I-Glasses™ could also be used. Other display apparatus include an LCD display or any television monitor.

Selection criteria for a power source and carrier included: hands-free, transportable, self-contained power, and able to carry extra equipment. A basic radio/battery box (the "radio/power unit" in FIG. 8) with a strap, similar to a shoulder bag or a purse, was used to house the operator control unit's video receiver, data transceiver data communication radio, processors for a display monocle, non-breakable patch antennae, batteries (Type DR36), which can provide 1500 ma power for approximately 2 hours of continuous use, and a small PIC16C73 processor manufactured by Microchip to monitor battery voltage, with display on a hand-held device, and to switch video frequencies. For the chip, any microprocessor would work. Additional devices, such as the hand-held data display (the handheld control unit shown in FIG. 8) with touch screen, joystick, and main processor were connected with a cord to the radio/battery box, also known as the operator control unit, in the implemented embodiment. Commands input through input-output system 72, were processed by the operator control unit, and sent to the robots. Each robot could return status information and/or video which was displayed on either input-output system 72 touchscreen or video display apparatus 77.

The main processor used was model A engine P made by Tern Inc. Implemented input-output system 72 consisted of two devices: a touch screen with LCD for displaying data/menus and input and a joystick. The touch screen used was model # GTC100 manufactured by Designtech Engineering Company and was driven in one implementation by Tem's A engine main processor. The joystick used was model XVL161-7.3FFB10K manufactured by CDS/NEDCO. As an alternative, CyberPuck's™ two-axis joystick also could be used in input-output system 72.

The A Engine P processor was used in the implementation to format inputs into command strings downloaded to the data radio. Also in the example embodiment, a corresponding control unit on the robot (also an A Engine P) was used to receive RS-232 commands and to control mobile robot or robotic vehicle motors. Software, extended specifically for robots linked in tandem in order to operate each robot individually or in linked mode, incorporates a Sandia National Laboratories-developed simple communication protocol with a limited set of robot instructions. Those skilled in the art will appreciate software and communication protocols suitable for other applications.

Various details have been given for an example embodiment for a robotic vehicle system, a coupling device, and a control system. Hardware and software alternatives, known to those skilled in the art, can be used in place of the specific elements discussed for the example embodiment. Data sheets showing technical details for specific manufacturers' products used in the example embodiment for the above elements are incorporated herein by reference. See Designtech Engineering Co., GTC100 operator interface product sheet, incorporated herein by reference; FreeWave Technologies, Inc., RS232 OEM Module Technical Specifications and Configuration Guide, incorporated herein by reference; Tern Inc., A-Engine-P™ data sheet, incorporated herein by reference; Southern California Microwave, VT05 series features and specifications and VR20 series features and specifications, incorporated herein by reference; Microchip Technology Inc., "PIC16C7X," DS30390A-page 2–517, 1995, incorporated herein by reference; MicroOptical Corp., clip-on display monocle data sheet.

Control of Tandem Robots

The present invention provides for terrain mobility using a coupling device connecting a tandem robotic vehicle comprising two robots.

A control system can be used to control mobile robots operated in tandem in either linked or individual operations. In an example embodiment, each mobile robot can have an assigned communication frequency. An operator can select a particular mobile robot to control individually, then control that robot. The operator can then select a different mobile robot to. control (by its assigned communication frequency). Some applications can benefit from controlling all the robots simultaneously in either a linked or unlinked mode.

Minor software and hardware changes can be implemented to modify an operational embodiment to allow control of more than two mobile robots.

Tandem Mobile Robots

Figure 15:
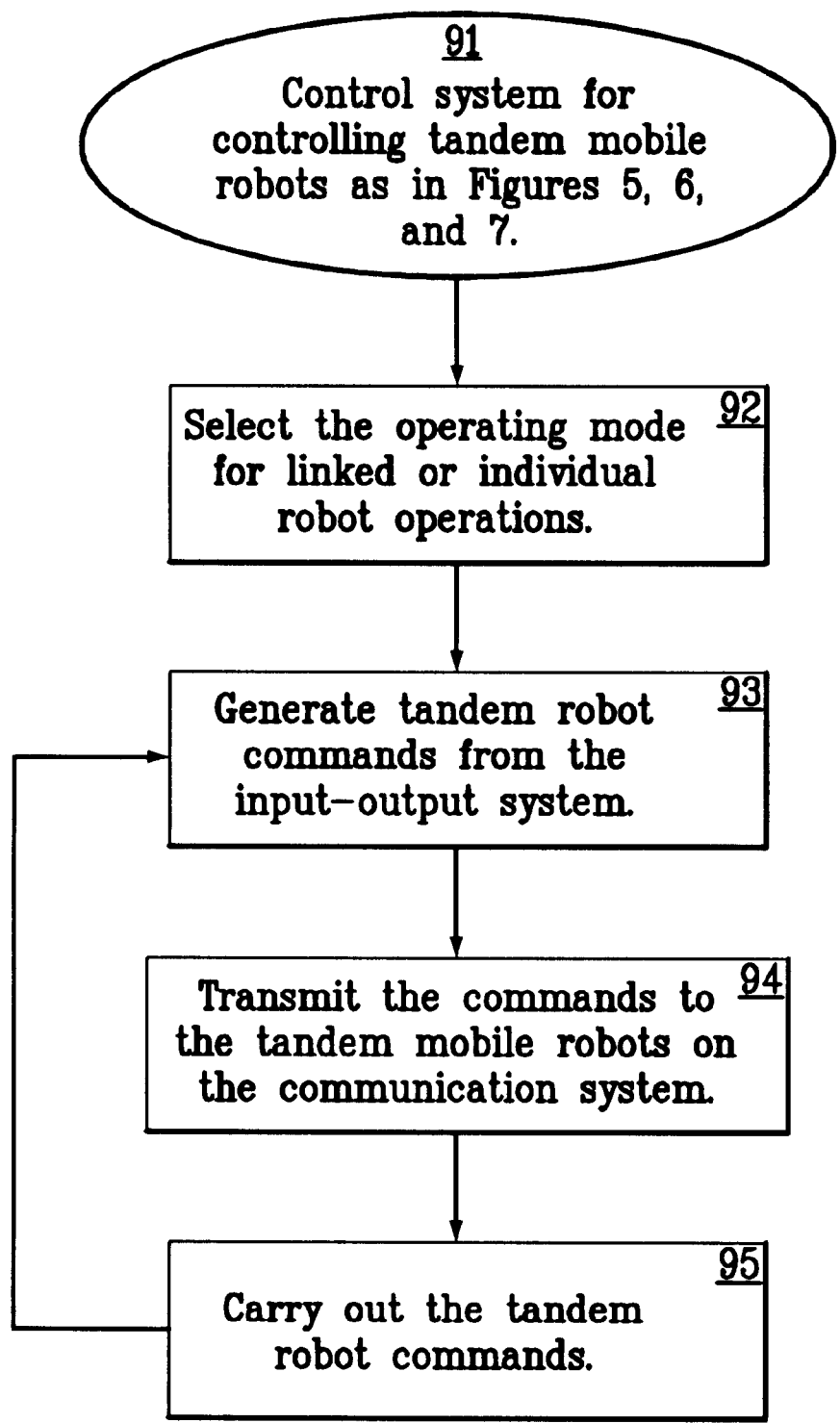
FIG. 15 depicts a simplified method for controlling a mobile robot using a control system according to the present invention.

FIG. 15 depicts a mobile robot according to the present invention. In the method for a control system, all elements of any embodiment of the control system can be worn or carried by the operator to provide portability.

Start in step 91 with a control system as in FIGS. 5, 6, and 7. The control system can have a power source and a control unit as in FIG. 5. In addition, the control unit, for example, can comprise an input-output system and a communication system as in FIG. 6. Another control system which can be controlled by the method of the present invention can be the system depicted in FIG. 7.

Next, in step 92, an operator can select the operating mode for linked or for individual robot operations. In linked mode, the robots can all follow the same tandem robot commands, or the commands can be synergistic (for example, different but cooperating commands for skid steering). In unlinked mode, each robot can receive different robot commands (for example, one robot traversing an RF black-out area and another robot staying stationery and repeating commands from an operator).

Generate tandem robot commands from the input-output system, step 93. Input-output system can comprise a motion command device and a mode selector. The input-output system can generate tandem robot commands proportionally responsive to operator input from a motion command device. In conjunction with the operation of the motion command device, a mode selector can be used to receive mode-input from the operator and modify operation of the control system.

Transmit the tandem commands to the mobile robot(s) using the communication system, step 94. Data can be transmitted and received in bidirectional communications between the control system and one or more mobile robots, using data transceivers, an input-output system, and a microprocessor. Video is one-way and can be received by the operator control unit from one or more mobile robots, using a video receiver and a video display apparatus. The various peripheral units can be powered by a portable power source.

Each robot should carry out the tandem robot commands that it receives, step 95.

Repeat steps 93 through 95.

The particular sizes and equipment discussed above are cited merely to illustrate particular embodiments of the invention. It is contemplated that the use of the invention may involve components having different sizes and characteristics. For example, while the coupling device is shown connecting tandem robotic vehicles, it could also be used on occupied, driver-controlled vehicles, and on tandem systems where the trailing vehicle is unpowered. It is intended that the scope of the invention be defined by the claims appended hereto.

We claim:

1. A robotic vehicle system for terrain navigation mobility, comprising.
 a) two robots, comprising a first robot and a second robot, wherein each of the two robots has dual tracks; and
 b) a coupling device, comprising:
  i) a connector, mounted with the first robot; and
  ii) a companion receiver, mounted with the second robot, mate-able with the connector to form the coupling device to connect the two robots in tandem, wherein the companion receiver substantially limits angular motion in the horizontal plane relative to the first robot and the second robot wherein, the coupling device has remote de-couple capability.

2. The robotic vehicle system of claim 1, wherein the coupling device comprises a powered device having a plurality of stop-positions.

3. The robotic vehicle system of claim 1, wherein the coupling device has remote de-couple cababilty.

4. The robotic vehicle system of claim 1, wherein the coupling device has remote couple capability.

5. The robotic vehicle system of claim 1, wherein one or more of the two robots has modular payload capabilities.

6. The robotic vehicle system of claim 1, further comprising a control unit, in communication with each of the two robots, the control unit comprising:
 a) an input-output system, adapted to receive input from an operator and generate tandem robot commands; and
 b) a communication system, adapted to transmit the tandem robot commands to the robotic vehicle system.

7. The robotic vehicle system of claim 6, wherein the control unit comprises a linked robot control mode, operably controlling the two robots in tandem from the tandem robot commands.

8. The robotic vehicle system of claim 6, wherein the control unit comprises a repeater control mode, communicating the tandem robot commands between the robots using the repeater control mode, and cooperative controlling the two robots in synergy.

9. The robotic vehicle system of claim 6, wherein the input-output system comprises:
 a) a motion command device, proportionally responsive to the operator input; and
 b) a mode selector, adapted to receive mode-input from the operator and modify operation of the control unit.

10. The robotic vehicle system of claim 6, each robot comprising a robot data transmitter, wherein the communication system comprises a control unit data receiver responsive to each robot data transmitter.

11. The robotic vehicle system of claim 10, wherein the communication system further comprises a video receiver.

12. The robotic vehicle system of claim 6, each robot comprising a robot data receiver, wherein the communication system comprises a control unit data transmitter, wherein each robot data receiver is responsive to the control unit data transmitter.

13. The robotic vehicle system of claim 12, wherein the robot further comprises a robot video unit.

14. The robotic vehicle system of claim 6, each robot comprising a robot data transceiver, wherein the communication system comprises a control unit data transceiver capable of communication bi-directionally with each robot data transceiver.

15. The robotic vehicle system of claim 14, wherein the robot further comprises a robot video unit and wherein the communication system further comprises a video receiver.

16. A robotic system for terrain navigation mobility comprising:
 a) a plurality of coupling devices; and
 b) a plurality of robots, connectable with the plurality of coupling devices to form the robotic system, wherein each robot has dual tracks, wherein each coupling device in the plurality of coupling devices operably connects each robot to another robot to substantially limit angular motion in the horizontal plane, wherein each coupling device has remote de-couple capability.

17. The robotic system of claim 16, further comprising a control unit, in communication with each robot in the plurality robots, the control unit comprising:

a) an input-output system, adapted to receive input from an input-generator and generate robot commands; and b) a communication system, adapted to transmit the robot commands to the robotic system.

18. The robotic system of claim 17, wherein the input-generator is an autonomous controller.

19. The robotic system of claim 16, wherein each coupling device has remote couple capability.

20. A robotic vehicle system for navigation mobility, comprising:

a) two robots, each robot comprising:
  i) a robot data transceiver;
  ii) a robot video unit; and
  iii) dual tracks;

b) a coupling device, operably connecting the two robots in tandem, wherein the coupling device substantially limits angular motion in the horizontal plane relative to the two robots, wherein the coupling device has remote de-couple capability;

c) an input-output system, comprising:
  i) a motion command device, generating multiple-axis commands proportionally responsive to input from an operator; and
  ii) a mode selector, adapted to receive mode-input from the operator and modify operation of the robotic vehicle system;

d) a control unit data transceiver, capable of bi-directional communication with each robot data transceiver;

e) a video receiver, responsive to each robot video unit;

f) a video display apparatus, responsive to the video receiver;

g) a microprocessor, responsive to the input-output system and responsive to the control unit data transceiver; and h) a power source, powering the robotic vehicle system except for the two robots and the coupling device.

21. The robotic system of claim 20, wherein the coupling device has remote couple capability.

* * * * *